United States Patent [19]

Leining

[11] 4,451,953
[45] Jun. 5, 1984

[54] HAND HELD SKINNING DEVICE

[75] Inventor: Lyndon R. Leining, Austin, Minn.

[73] Assignee: Geo. A. Hormel & Company, Austin, Minn.

[21] Appl. No.: 496,101

[22] Filed: May 19, 1983

[51] Int. Cl.³ .............................................. A22B 5/16
[52] U.S. Cl. ........................................ 17/21; 99/589
[58] Field of Search ................ 17/21, 62; 99/589, 584

[56] References Cited

U.S. PATENT DOCUMENTS

| | | | |
|---|---|---|---|
| 3,340,916 | 9/1967 | Burch | 99/589 |
| 4,071,923 | 2/1978 | Smith | 17/21 |
| 4,186,461 | 2/1980 | Leining | 17/21 |

Primary Examiner—Willie G. Abercrombie
Attorney, Agent, or Firm—Williamson, Bains, Moore & Hansen

[57] ABSTRACT

A hand held power driven skinning device includes a housing having a handle connected thereto and having a blade assembly mounted thereon. A driven tooth roll assembly is provided with a shaft that is journaled on the housing. A clean-out bar assembly is mounted in the housing and engages the tooth roll assembly. A retainer element on the blade assembly and a locking element on the shaft for the tooth roll assembly coact to releasably lock the blade assembly, the tooth roll assembly and the clean-out bar assembly on the housing. Manipulation of the locking element permits ready disassembly and reassembly of the tooth roll assembly, the blade assembly and the clean-out bar assembly on the housing.

8 Claims, 6 Drawing Figures

HAND HELD SKINNING DEVICE

SUMMARY OF THE INVENTION

This invention relates to a skinning device, and more particularly to an improved hand supported skinning device for removing portions of skin from animal carcasses, such as hogs and the like.

In the food processing field, including the meat packing industry, the various devices used on food products must be periodically cleaned in accordance with sanitary requirements. When devices are comprised of several components, it is often necessary to disassemble the components for cleaning. Hand held skinning devices used in the meat packing industry are disclosed in U.S. Pat. Nos. 4,186,461 and 4,071,923. However, neither of these skinning devices are arranged and constructed to permit ready assembly and disassembly of the various components thereof. Therefore, disassembly for cleaning, replacement or repair of components of these other similar devices and reassambly thereof involves a cumbersome and time-consuming operation.

It is therefore a general object of this invention to provide an improved hand held skinning device which may be readily disassembled and reassembled without the need of tools and with a minimum of effort.

More specifically, it is an object of this invention to provide an improved hand held skinning device wherein the unlocking of a single locking element permits the tooth roll assembly, blade assembly and tooth roll clean-out bar to be readily removed for cleaning, replacement or repair.

These and other objects and advantages of the invention will appear more fully from the following description made in conjunction with the accompanying drawings wherein like reference characters refer to the same or similar parts throughout the several views.

FIGURES OF THE DRAWING

FIG. 4 is a fragmentary side elevational view illustrating the relationship of certain components of the device in a locked position;

FIG. 5 is a fragmentary side elevational view similar to FIG. 4 but illustrating the components in an unlocked condition; and FIG. 6 is a fragmentary front elevational view of the components illustrated in FIG. 4.

DESCRIPTION OF THE PREFERRED EMBODIMENT

Figure 1:
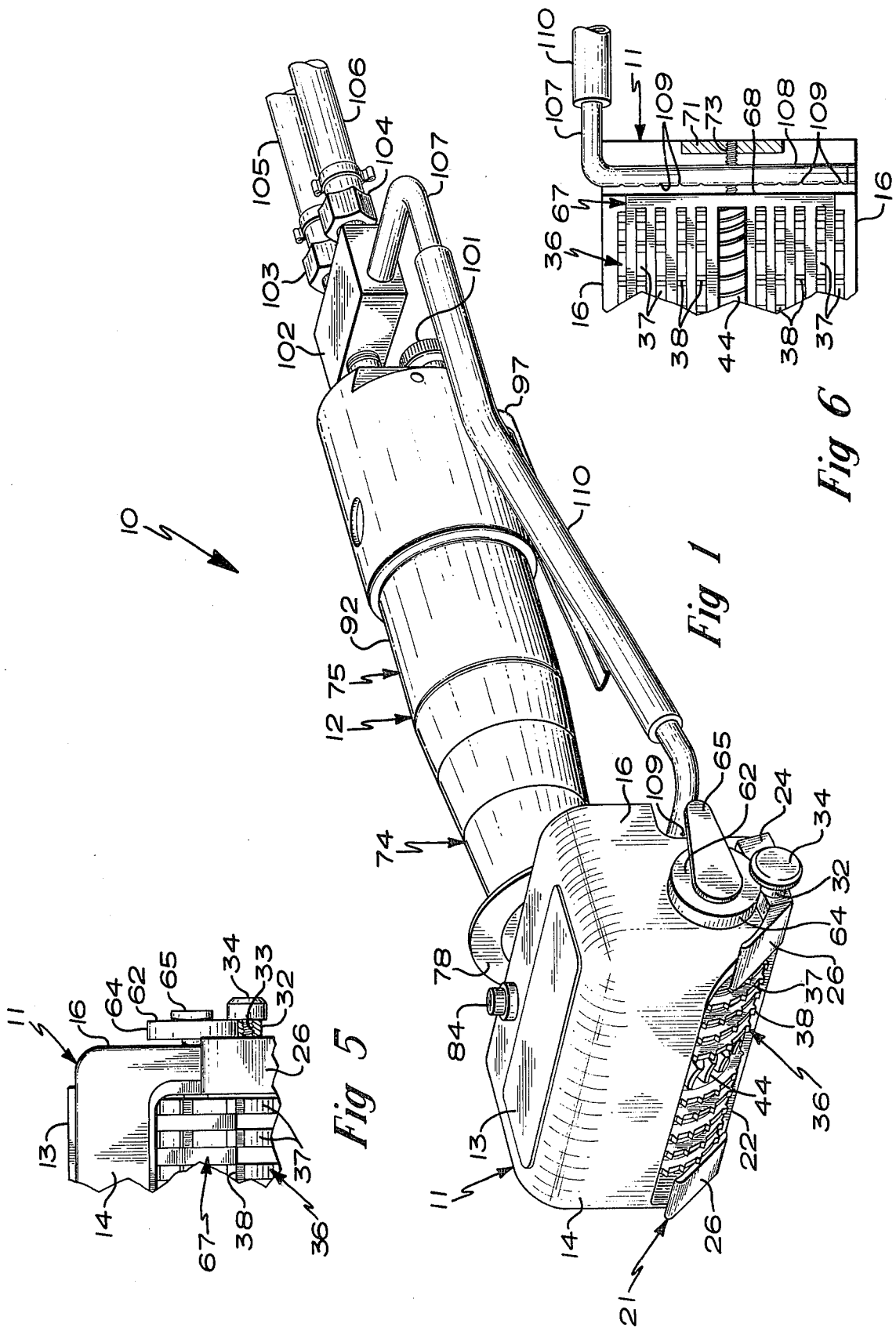
FIG. 1 is a front perspective view of the improved hand held skinning device.
Figure 2:
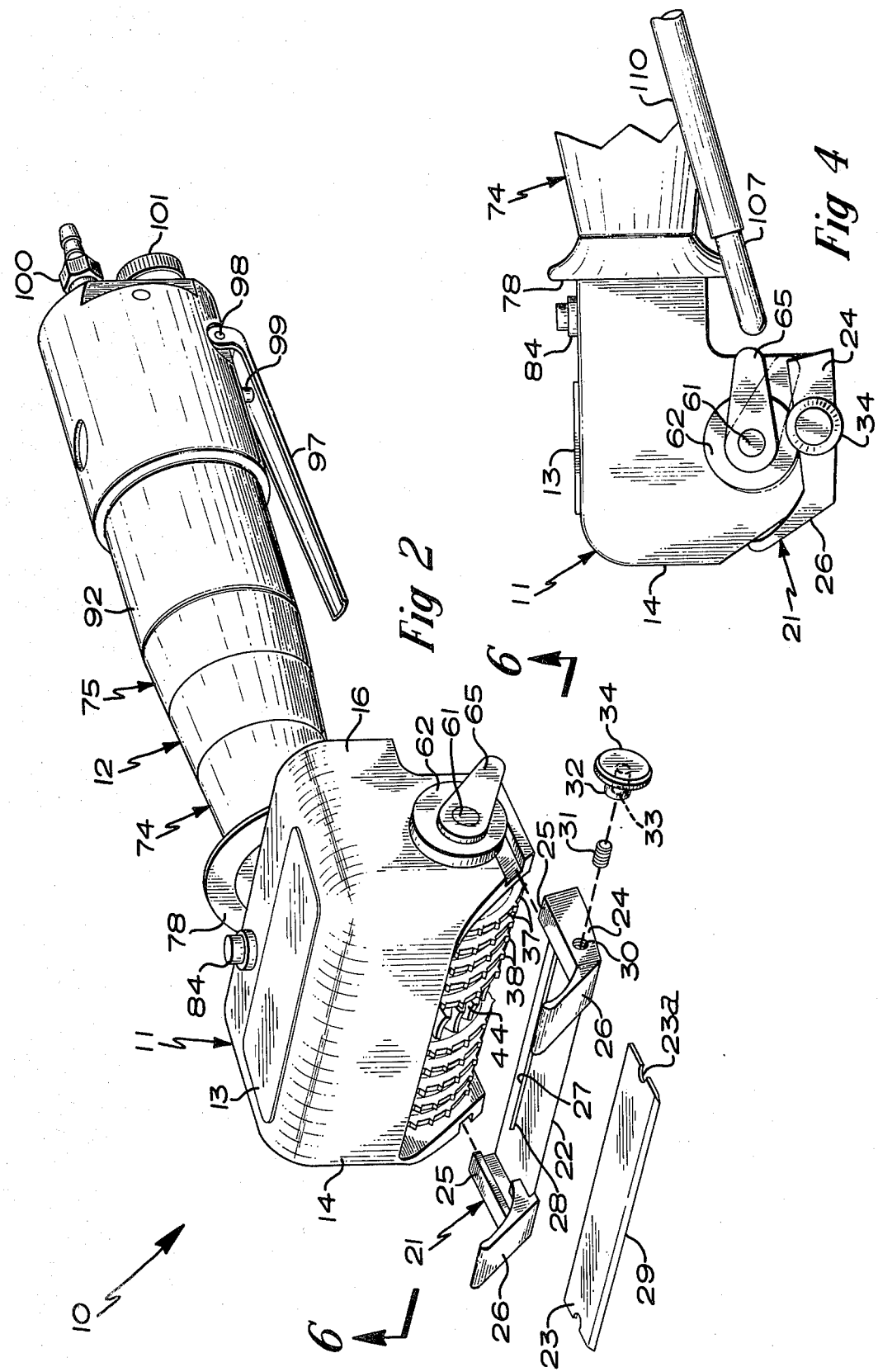
FIG. 2 is a fragmentary front perspective view of a portion of the skinning device with certain parts thereof exploded for clarity.

Referring now to the drawings, and more particularly to FIG. 1, it will be seen that one embodiment of the novel hand held skinning device or knife, designated generally by the reference numeral 10, is thereshown. The skinning device 10 includes a generally rectangular shaped housing 11 having one end of an elongate handle 12 secured thereto and projecting therefrom. The housing 11 is of one-piece construction and is formed of a suitable cast metal and includes top wall 13, front wall 14, rear wall 15 and opposed side walls 16. It will be noted that the lower edges of the front wall 14 and the rear wall 15 are located above the lower edges of the side walls 16.

The side walls 16 are each provided with a circular opening 17 therein and an elongate slot 18. It will be noted that the slot 18 in each side wall is formed in the outer surface thereof and extends from the front edge thereof, but terminates short of the rear edge of the side wall. Each side wall 16 has a threaded opening 19 therein which extends from the rear edge thereof and communicates with the slot 18. Each threaded opening 19 accommodates a set screw 20 therein.

The skinning device 10 includes a blade assembly 21 comprised of a blade holder 22 which supports a disposable blade 23 thereon. It will be noted that the blade holder 22 is of generally rectangular configuration and is provided with vertical flanges 24 at opposite sides thereof. The vertical flanges 24 are each provided with an inturned flange 25 at its upper portion that projects inwardly therefrom. These inturned flanges 25 are adapted to engage in the slots 18 in the side walls 16. The blade holder 22 also is provided with a pair of blade markers 26 that project forwardly and upwardly from opposite side portions thereof. The blade markers 26 indicate or mark the portion of the skin being removed by the skinning device.

The blade holder 22 is also provided with a transversely extending, upwardly projecting lip 27 adjacent its rear edge that extends between the blade markers 26 and which defines a shoulder 28 against which is positioned the blade 23. It will be noted that the disposable blade 23 is also of rectangular configuration and is of a size to extend between the inner vertical surfaces of the blade markers 26 so that the rear edge of the blade engages the shoulder 28. The blade 23 is provided with a cutting edge 29 that projects forwardly of the front edge of the blade holder 22 when the blade assembly is mounted on the housing 11. It will also be noted that one of the vertical flanges 24 has a threaded opening 30 therein which threadedly accommodates a set screw 31. The set screw 31 is attached to a retainer element 32 having a threaded opening 33 therein. The set screw 31 also extends into a notch 23a in the blade 23 to prevent accidental displacement of the blade from the blade holder. The retainer 32 also has a circular cap 34 that projects radially outwardly therefrom. It is pointed out that the portion of the blade assembly 21 may be adjusted by adjusting the set screws 20.

Figure 3:
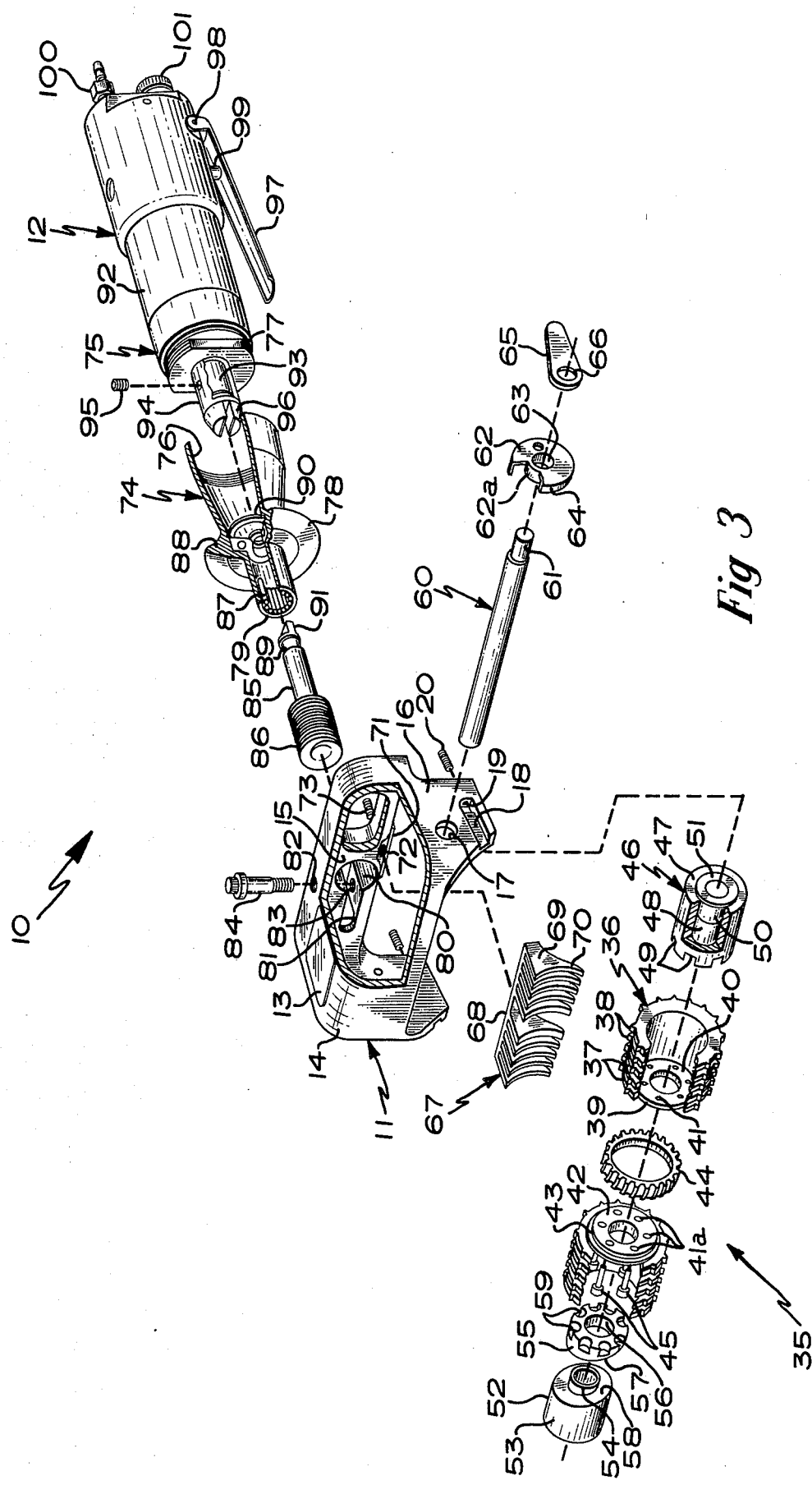
FIG. 3 is an exploded perspective view of the entire skinning device.

Referring now to FIG. 3, it will be seen that the skinning device 10 also includes a tooth roll assembly 35 which is mounted on the housing for revolving movement relative thereto. The tooth roll assembly 35 is comprised of a pair of substantially identical, generally cylindrical tooth rolls 36, each having a plurality of axially spaced apart, radially extending flanges 37 thereon. Each flange has a plurality of circumferentially arranged teeth 38 extending radially outwardly therefrom. Each tooth roll 36 also has an end plate 39 at its inner end, the latter having a centrally located opening 40 therein. One of the tooth rolls has a plurality of smaller threaded openings 41 therethrough, and the other tooth roll has unthreaded openings 41a therethrough.

The annular end plates 39 each have a reduced portion 42 that defines an annular shoulder 43. The annular shoulders 43 on the end plates 39 of the tooth rolls 36 support a ring gear 44 thereon. In this regard, it will be seen that the tooth rolls 36 are rigidly secured together by bolts 45 that project through the unthreaded openings 41a in the end plate of one of the tooth rolls and threadedly engage in the threaded openings 41 in the end plate of the other tooth roll. When the tooth rolls are secured together, the ring gear 44 is clamped in mounted relation on the annular shoulders 43.

One of the tooth rolls 36 has a bearing 46 positioned therein which is comprised of an outer bearing sleeve 47 that is positioned around an inner bearing sleeve 48. The inner bearing sleeve 48 is formed of a Teflon urethane material, and the outer bearing sleeve has a plurality of notches 49 which accommodate the ends of the shanks of the bolts 45 when the threaded tooth roll assembly is in an assembled condition. It will also be noted that the bearing 46 also includes an end bearing sleeve 50 having a radially flange 51 extending outwardly therefrom. This end bearing sleeve 50 is also formed of a Teflon urethane material.

Bearing 52 for the other tooth roll includes an outer bearing sleeve 53 positioned around an inner bearing sleeve 54. The inner bearing sleeve is also provided with an end flange (not shown) and is formed of a Teflon urethane material. The bearing 52 also includes a bearing hub 55 having an outer diameter corresponding to the outer diameter of the outer bearing sleeve 53. The bearing hub has an opening 56 therethrough and presents a 5° beveled face 57 which mates with a 5° beveled face 58 on bearing sleeve 53 when the hub is positioned on the inner bearing sleeve 54. When the faces 57 and 58 are disposed in mating relation the bearing will be aligned with the openings in the end plates and the bearing in the other tooth roll. It will also be noted that the hub 55 has a plurality of notches 59 therein for accommodating the head ends of the bolts 45. Finally, it is pointed out that when the hub 55 is disposed in mating relation with the outer bearing sleeve 53, the hub actually constitutes an extension of the outer bearing sleeve.

The tooth roll assembly 35 is journaled on an elongate shaft 60 that projects through the openings 17 in the side walls 16 of the housing 11. One end portion of the shaft 60 is provided with an eccentric 61 that is located exteriorly of the associated side wall 16. The hub 62a of a circular locking member 62 is positioned upon the eccentric 61 and is secured thereon by welding or the like. In the embodiment shown, the hub 62a has an opening 63 therein through which the eccentric 61 projects. The circular locking member 62 is provided with an inturned annular flange 64.

An elongate locking lever 65 having an opening 66 therein is also positioned upon the eccentric 61 and is rigidly secured to the locking member 62 by welding or the like. The locking member 62 prevents axial displacement of the shaft 60 from the housing 11 in one axial direction. In the embodiment shown, the circular locking member will engage the adjacent side wall 16 and prevent axial displacement of the shaft towards the left, as viewed in FIG. 3. The locking member 62 is movable between a locked and released position with respect to the blade assembly 21. When the locking member is in the locked position, the blade assembly is retained in locked mounted relation on the housing 11. When the locking member is moved to the unlocked position, the blade assembly 21 may be readily removed from the housing to permit replacement of the blade.

In this regard, it will be seen that when the locking lever 65 is in the locked position, as illustrated in FIG. 4, the flange 64 of the locking member 62 will engage the retainer element 32 in frictional engagement and therefore lock the blade holder against movement relative to the slots 18 in the side walls 16. It will be noted that axial center of the locking member 62 has been moved beyond the center of the circular retainer cap 34. However, when the locking lever 65 is rotated in a clockwise direction to the unlocked position, as viewed in FIG. 5, the locking member 62 will be moved out of frictional engagement with the retainer element 32 and thereby permit the blade assembly to be slid forwardly out of engagement with the housing 11.

It will also be seen that when the locking member 62 and the locking lever 65 are in the locked condition, the circular cap 34 of the retainer will be positioned in obstructing relation with the locking member 62 and will prevent axial movement of the shaft and locking member in an axial direction to the right, as viewed in FIG. 3. However, when the locking member and locking lever are moved to the unlocked position, the blade assembly not only may be readily removed from mounted relation on the housing, but the shaft may be removed from the housing thereby permitting removal of the tooth roll assembly.

The skinning device 10 also includes a one piece tooth roll clean-out bar assembly 67 which is formed of a Teflon material and which includes a substantially elongate flat bar 68 having a plurality of substantially identical flat clean-out bar elements 69 integral therewith and projecting forwardly and at right angles therefrom. Each of the clean-out elements 69 is provided with an arcuate front surface 70. In the embodiment shown, each clean-out element 69 projects between a pair of the flanges 37 on one of the tooth rolls 36 and engages the surface of the tooth roll in bearing engagement therewith. These clean-out elements prevent the accumulation of skin, flesh and the like from accumulating in the spaces between adjacent flanges 37 of each tooth roll.

Referring again to FIG. 3, it will be seen that the rear wall 15 of the housing 11 is provided with a generally centrally located, downwardly projecting flange 71 which has a threaded opening 72 therein. The threaded opening 72 accommodates a set screw 73 therein which projects forwardly from the flange and engages the bar 68 of the clean-out bar assembly 67. The set screw serves to urge the clean-out bar assembly in a forward direction so that the arcuate surfaces 70 on the clean-out elements 69 engage the surface of the tooth rolls.

Referring again to FIG. 3, it will be seen that the handle 12 of the skinning device includes a front handle member 74 and a rear handle member 75, each being of hollow construction. The rear end portion of the front handle member 74 is internally threaded, as at 76, for threadedly engaging the external threads 77 on the front portion of the rear handle member 75 to releasably secure the handle members together. The front handle member 74 is provided with a flange 78 which projects radially outwardly therefrom, intermediate the ends thereof. The front handle member 74 terminates forwardly in a reduced portion 79 that projects into an opening 80 formed in the central portion of the rear wall 15 of the housing 11.

The rear wall 15 of the housing 11 also has a slot type opening 81 therethrough which communicates with the opening 80. The top wall of the housing has an opening 82 therein which is disposed in aligned relation with a threaded opening 83 in the surface of the rear wall defined by the slotted opening 81. A bolt 84 projects through the opening 82 and threadedly engages in the opening 83 to clamp the housing 11 against the reduced front end portion 79 of the front handle member 74.

An elongate shaft 85 is positioned interiorly of the front handle member 74 and is provided with a worm gear 86 at its forward end. When the shaft is positioned within the front handle member 74, the worm gear 86 projects forwardly of the front handle member 74. The worm gear 86 meshes with the ring gear 44 of the tooth roll assembly 35.

The front handle member 74 is also provided with a Torrington needle bearing assembly 87 for engaging the shaft 85. The front handle member is also provided with a ball bearing assembly 88 that engages the rear portion of the shaft 85. In this regard, it will be noted that the shaft 85 has a reduced portion 89 adjacent its rear end which is engaged by retaining ring 90 for retaining the shaft 85 against axial displacement relative to the front handle member 74. The shaft 85 terminates rearwardly in a male tang element 91, as best seen in FIG. 3.

The rear handle member 75 has a rotary air motor 92 therein which is provided with an output shaft 93 that projects forwardly from the rear housing member 75. A drive adapter sleeve 84 is positioned around the output shaft 93 and is secured thereto by set screw 95. The drive adapter sleeve is provided with a female tang element 96 that accommodates and engages the male tang element 91 on the shaft 93. With this arrangement, when the air motor 92 is energized the shaft 93 will be rotated to thereby drive the shaft 85 and the tooth roll assembly 35 through the worm gear 86 and the ring gear 44.

Means are provided for actuating the air motor, and this means includes an elongate actuating trigger 97 that is pivotally connected to the rear housing member adjacent the rear end thereof by a pivot pin 98. The actuating handle 97 engages a valve actuating element 99 which controls a control valve (not shown) for operating the air motor 92.

The rear handle member 75 is also provided with a fitting 100 which projects rearwardly from the rear end thereof and which is connected to a conduit (not shown) in the rear handle member 75 that communicates with the air motor 92. The exhaust side of the air motor 92 is connected in communicating relation with a muffler 101 that is mounted on the rear handle member and serves to muffle the exhausted air during the operation of the skinning device.

A manifold block 102 is mounted on the fitting 100 and the manifold block is provided with a fitting 103 and a fitting 104. The fitting 103 is connected to a conduit 105 that is connected to a source of air under pressure. The fitting 104 is connected by a conduit 106 to a source of heated water under pressure.

The manifold 102 is provided with an outlet conduit 107 that extends forwardly alongside the handle 12 and is bent at substantially right angles to form a transverse spray pipe 108. This spray pipe 108 of the conduit 107 is positioned rearwardly but adjacent the clean-out bar assembly 67 and the tooth roll assembly 35. The spray pipe 108 has a length dimension corresponding to the length dimension of the tooth roll assembly 35. This spray pipe 108 is provided with a plurality of outlet openings 109 therein. During operation of the skinning device, water under pressure heated to 180° F. will be constantly sprayed through the openings 109 in the spray pipe 108 of the conduit 107 to constantly clean the tooth roll assembly and the clean-out bar assembly. A thermally insulating cover 110 covers the conduit 107 to prevent accidental burning of the operator's hand.

In use, the skinning device will be used to remove patches of skin from a hog carcass or the like, and will be used to remove skin from areas of the carcass that are difficult to remove with other skinning devices. The operator will hold the skinning device by the handle 12 and will depress the actuating trigger 87 to operate the air motor. The air motor will drive the worm gear 86 which revolves the tooth roll assembly 35. The tooth roll assembly will grip the skin to be removed and pull the skin against the blade 23. As the removed strip of skin is wound about the tooth roll, the clean-out bar assembly 67 will direct the skin outwardly over the blade holder 22. During this operation, the spray pipe 108 will discharge a spray of hot water against the tooth roll, the blade and the clean-out bar assembly 67.

At the completion of a skinning operation, it is necessary to disassemble the main components of the skinning device for cleaning. The primary components which must be cleaned are the blade assembly, the tooth roll assembly and the clean-out bar assembly. Thus an operator will shift the locking lever 65 from its locked condition to the unlocked position. When this occurs, the locking member 62 will be cammed out of engagement with the retainer element 32. This permits the operator to remove the blade assembly 21 and to dispose of the disposable blade 63, if necessary. When the blade assembly 21 has been removed from mounted relation on the housing 11, the shaft 60 may be removed thereby permitting the tooth roll assembly 35 and clean-out bar assembly 67 to be removed from the housing. The bearings may be removed from the tooth roll assembly since these bearings are not positively retained within the tooth rolls 36 when the tooth roll assembly is removed from the housing 11. The operator may then properly clean these components and the device may be quickly reassembled.

In reassembling the device, the operator will replace the bearings in the tooth rolls 36. The beveled faces on the outer bearing sleeve 53 and the hub 55 serve to center the bearings with respect to each other which permits the shaft 60 to be reinserted through the openings in the side walls of the housing and through the bearings of the tooth roll assembly.

However, before the tooth roll assembly is mounted on the housing, the clean-out bar assembly 67 will be positioned so that the clean-out elements project between adjacent pairs of flanges on the tooth rolls. After the clean-out bar assembly and tooth roll assembly are mounted on the housing 11, the blade assembly will be mounted on the housing and the locking lever 62 will be moved to the locked condition thereby releasably locking all of the major components of the skinning device on the housing 11.

It will be seen that disassembly and reassembly of the major components of the skinning device necessitate only the manipulation of the locking lever 65. This particular arrangement obviates the need of tools and also permits the major components to be removed intact as subassemblies to the skinning device. This is not possible with other prior art devices.

Thus it will be seen that we have provided a novel hand held skinning device which may be readily assembled and disassembled by manipulating a single locking element.

It will therefore be seen that we have provided a novel hand held skinning device, which is not only of simple and inexpensive construction and operation, but one which functions in a more efficient manner than any heretofore known comparable device.

While the preferred embodiments of the present invention have been described, it should be understood that various changes, adaptions and modifications may be made therein without departing from the spirit of the invention and the scope of the appended claims.

What is claimed is:

1. An improved hand-held power skinning knife, comprising:
   a housing including a top wall and opposed side walls, means defining guides in said side walls;
   an elongate handle connected with said housing, a motor in said handle, drive means on said handle connected with said motor;
   a skinning blade assembly including a blade holder, guide means on said blade holder engaging said guides in said side walls to mount the blade holder on the housing, a disposable blade on said blade holder, a retainer element on said blade holder and projecting outwardly therefrom;
   a tooth roll assembly including a pair of similar, generally cylindrical tooth rolls positioned in axially aligned relation and having a plurality of axially spaced apart flanges projecting therefrom, each flange on each tooth roll having a plurality of teeth projecting outwardly therefrom, a ring gear positioned between and secured to said tooth rolls and engaging said drive means;
   an elongate shaft journaled in said side walls of the housing and extending through said tooth roll assembly to mount the latter thereon, one end portion of said shaft having an eccentric cam thereon located exteriorly of the adjacent side wall;
   a lock element on said eccentric cam cooperating with the adjacent side wall of the housing to prevent axial displacement of the shaft in one direction, said retainer element being disposed in obstructing relation with said lock element and preventing axial displacement of the shaft in the opposite direction, said lock element and said shaft being revolvable as a unit between locked and unlocked positions, said lock element when in the locked position engaging said retainer element to lock the blade assembly in mounted relation on the housing, said lock element when in the unlocked position permitting ready removal of the skinning blade assembly, said shaft and said tooth roll assembly.

2. The skinning device as defined in claim 1 wherein said guides on said side walls comprise elongate slots, said guide means on said blade holder comprising flanges engaging said slots.

3. The skinning device as defined in claim 1 and a single piece clean-out bar assembly mounted in said housing and including a substantially flat bar, a plurality of spaced apart, substantially flat clean-out elements integral with said bar and projecting forwardly therefrom, each clean-out element having an arcuate front edge engaging said tooth roll assembly, said clean-out bar assembly being readily removable from said housing with said blade assembly and tooth roll assembly when said lock element is shifted to the unlocked position.

4. The skinning device as defined in claim 1 wherein said lock element is of circular configuration and being cammed into functional locking engagement with the retainer element when said shaft and lock element are rotated to the locked position.

5. The skinning device as defined in claim 4 wherein said retainer element has an enlarged circular end positioned exteriorly in an obstructing relation with said lock element.

6. The skinning device as defined in claim 5 and an elongate locking lever secured to said lock element and projecting therefrom to facilitate rotation of the lock element between locked and unlocked positions.

7. The skinning device as defined in claim 1 wherein said tooth roll assembly includes a plurality of bearing elements positioned interiorly of said tooth rolls, a pair of said bearing elements having mating beveled faces engaging each other to center said bearing elements with respect to each other.

8. An improved hand-held power skinning knife, comprising:
   a housing including a top wall and opposed side walls, means defining guides in said side walls;
   an elongate handle connected with said housing having power means therein;
   a skinning blade assembly including a blade holder, guide means on said blade holder engaging said guides in said side walls to mount the blade holder on the housing, a disposable blade on said blade holder, a retainer element on said blade holder and projecting outwardly therefrom;
   a revolvable tooth roll assembly drivingly connected with said power means, said tooth roll assembly when revolved cooperating with said blade to remove skin of animal carcasses;
   an elongate shaft journaled on said side walls of the housing and having said tooth roll assembly mounted thereon, one end portion of said shaft having an eccentric cam thereon located exteriorly of the adjacent side wall;
   a lock element on said eccentric cam cooperating with the adjacent side wall of the housing to prevent axial displacement of the shaft in one direction, said retainer element being disposed in obstructing relation with said lock element and preventing axial displacement of the shaft in the opposite direction, said lock element and said shaft being revolvable as a unit between locked and unlocked positions, said lock element when in the locked position engaging said retainer element to lock the blade assembly in mounted relation on the housing, said lock element when in the unlocked position permitting ready removal of the skinning blade assembly, said shaft and said tooth roll assembly.

* * * * *